United States Patent
Mobley

[15] 3,698,660
[45] Oct. 17, 1972

[54] VARIABLE MAGNETIC HYSTERESIS ROD SYSTEM

[72] Inventor: Frederick F. Mobley, Silver Spring, Md.

[73] Assignee: The United States of America as represented by the Secretary of the Navy

[22] Filed: Oct. 7, 1970

[21] Appl. No.: 78,770

[52] U.S. Cl. .................................. 244/1 R, 310/93
[51] Int. Cl. .............................. B64c, H02k 49/00
[58] Field of Search ...... 244/1, 1 R; 310/93; 335/209, 335/284, 227; 336/221, 155, 175, 174

[56] References Cited

UNITED STATES PATENTS 3,497,160  2/1970  Mobley ....................... 310/93

Primary Examiner—Richard E. Aegerter
Attorney—Richard S. Sciascia and J. A. Cooke

[57] ABSTRACT

A variable magnetic hysteresis rod system capable of being controlled to provide varying amounts of hysteresis damping for a spacecraft. An elongated rod of magnetic hysteresis material is surrounded by one or more short sleeve members formed of chargeable magnetic material. Two windings are wound about the sleeve member and are energizable selectively with current pulses. One of the windings, when energized, produces a localized longitudinal magnetic field in the adjacent region of the magnetic hysteresis rod of sufficient magnitude to saturate that portion of the rod and thus cause the rod to act as a plurality of rods which collectively provide an amount of hysteresis damping different from that provided by the single rod. The second winding, when energized, destroys the effectiveness of the magnetic field produced by the first winding and thus returns the adjacent portion of the hysteresis rod to a non-saturated condition wherein the hysteresis rod again acts as a single rod, with its associated amount of hysteresis damping capability.

7 Claims, 4 Drawing Figures

INVENTOR.
FREDERICK F. MOBLEY

VARIABLE MAGNETIC HYSTERESIS ROD SYSTEM

BACKGROUND OF THE INVENTION

The magnetic hysteresis loss capability of certain well-known magnetic materials has been found useful, in the past, for damping the angular motions of space vehicles such as earth satellites. Normally, such a satellite damping system consists of a set of orthogonally-oriented rods of ferromagnetic material which has lossy magnetic hysteresis properties and is employed to damp out the various unwanted motions often experienced by a satellite, such as those resulting from launching into orbit and/or the oscillations of a satellite whose attitude is magnetically or gravity-gradient stabilized. The actual damping results from the fact that the unwanted satellite motion forces the material of the damping rods to repeatedly traverse its hysteresis loop; thereby dissipating the wanted kinetic energy of the satellite.

SUMMARY OF THE INVENTION

It is proposed in accordance with the present invention to provide a magnetic hysteresis rod system which is controllable to produce varying amounts of magnetic hysteresis loss damping, so as to combine rapid despin capability with optimum stabilization performance. Moreover, the proposed structure of the present invention, to be described in more detail hereinafter, is fully reversible in that it can readily be switched between its various hysteresis damping levels; it does not require steady electrical power; and, it obviates the need for a complex mechanical system in order to attain the different levels of damping.

More specifically, it is proposed in accordance with the present invention to provide a hysteresis rod system which comprises an elongated rod of magnetic hysteresis material and one or more sleeves of chargeable magnetic material surrounding the rod at preselected localized positions. The sleeve (s) is provided with a pair of selectively energizable windings. One of these windings, when energized, produces a localized, longitudinal magnetic field within the adjacent portion of the magnetic hysteresis rod of sufficient strength to magnetically saturate that portion of the rod and thereby effectively divide the rod, at that portion, by an air gap. This, in turn, causes the rod to have a reduced hysteresis damping capability. On the other hand, when increased hysteresis damping is again required, the other winding is energized to destroy the longitudinal magnetic field produced by the first winding and thereby remove the effective air gap from the associated portion of the magnetic hysteresis rod.

In view of the foregoing, the object of the present invention is to provide a variable magnetic hysteresis rod system capable of being controlled to provide varying amounts of hysteresis damping aboard a satellite or the like.

A further object of the present invention is to provide a hysteresis damping rod system having a controllable hysteresis damping capability and which damping rod system is fully reversible; does not require steady electrical power; and, obviates a need for a complex mechanical system to attain varying hysteresis damping capabilities.

Other objects, purposes and characteristic features of the present invention will in part be pointed out as the description of the present invention progresses and in part be obvious from the accompanying drawings, wherein.

Figure 1:
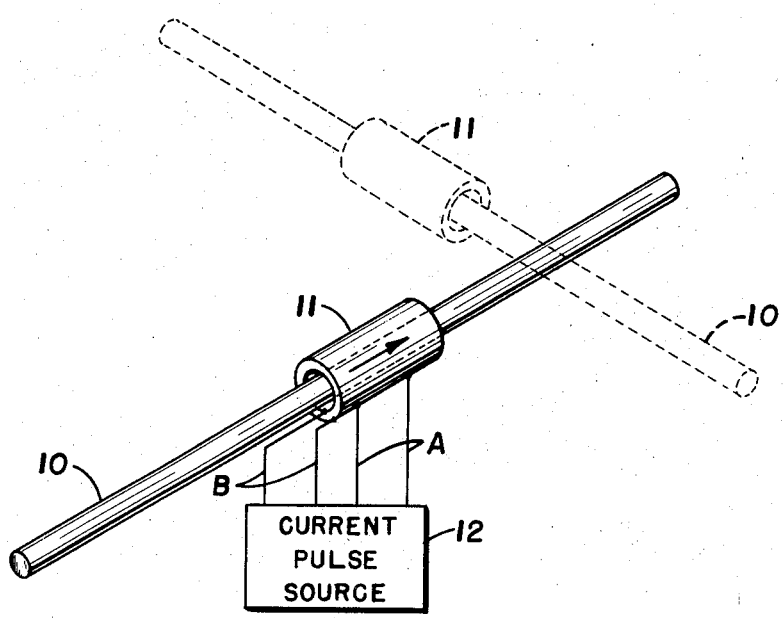
FIG. 1 is a diagrammatic illustration of one embodiment of the present invention comprising a magnetic hysteresis rod and a localized or short sleeve member which is formed of chargeable magnetic material and is provided with a pair of energizable windings.

Referring now to FIG. 1 of the drawings, the proposed magnetic hysteresis rod system of the present invention basically comprises a rod 10 formed of magnetic hysteresis material such as, for example, AEM 4750, and about which is mounted a short, annular sleeve member 11 formed of chargeable magnetic material such as, for example, vanadium-permendur (General Electric P–6). The sleeve 11 is provided with a pair of windings A and B (see FIG. 2) which are connected to a current pulse source represented at 12 in FIG. 1.

The winding A is wound circumfrentially about the sleeve 11; whereas, the winding B is wound about the length of the sleeve 11. The current pulse source 12 can be controlled in any desired manner to selectively supply an energizing current pulse to the windings A and B. For example, source 12 might be remote controlled from a ground station or could be pre-programmed.

Figure 3:
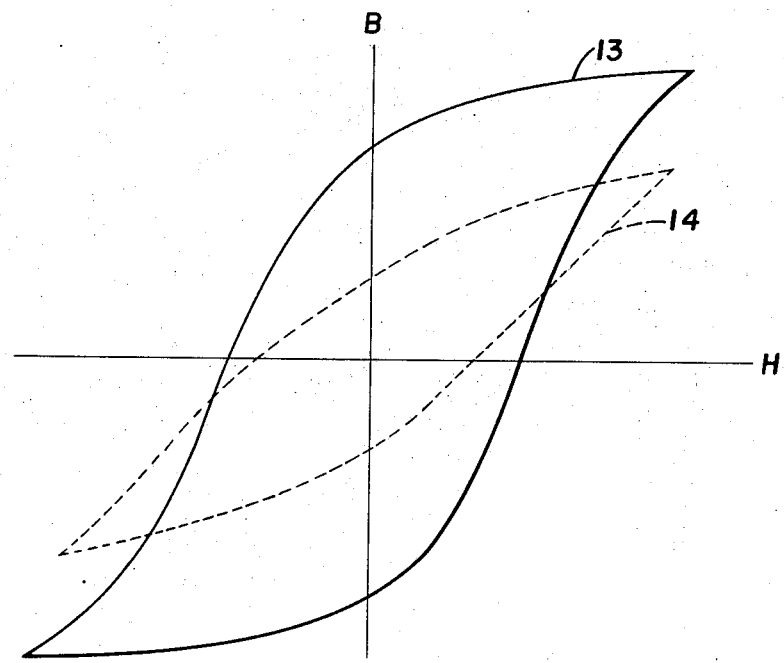
FIG. 3 is a diagrammatic plot of a pair of exemplary hysteresis loops useful in describing the operation of the proposed magnetic hysteresis rod system of the present invention.

In operation, the windings A and B are selectively supplied with a pulse of current from source 12, to vary the magnetic hysteresis damping capability of the rod system 10. More specifically, the hysteresis rod 10 is capable, by itself, of providing a certain predetermined amount of hysteresis damping aboard the spacecraft. This is represented, in FIG. 3, by the solid line hysteresis loop 13 for the rod 10 and might be utilized, for example, to rapidly despin in the spacecraft; e.g., satellite.

On the other hand, when reduced hysteresis damping is desired, for example to obtain optimum satellite stabilization, the winding A is supplied with a current pulse from source 12. This energization of winding A magnetizes the chargeable sleeve member 11 lengthwise and produces a longitudinally-directed magnetic field within the localized, adjacent portion or region of the hysteresis rod 10, as represented by the short, solid line arrow in FIG. 1. This longitudinal magnetic field is of sufficient strength or magnitude to magnetically saturate the adjacent portion of the rod 10 and thereby effectively produce an air gap at this saturated portion. As a result, the rod 10 has been effectively divided into two shorter rods which, collectively, have a reduced hysteresis damping capability, as represented by the smaller area hysteresis loop 14 shown in dotted form in FIG. 3. Similarly, if the rod 10 were divided into four pieces, as will be explained later, the over-all rod system would have a hysteresis loop with still less area and therefore provide a still lower level of hysteresis damping. As is well-known to those skilled in the art such reduced hysteresis damping capability is particularly desirable in order to obtain optimum stabilization performance aboard a satellite.

Obviously, the winding A could be steadily energized in order to create the above-described localized, longitudinal magnetic field in the adjacent portion of hysteresis rod 10. On the other hand, by forming the sleeve 11 of chargeable magnetic material, steady state energization of the winding A is not required; i.e., the winding A need only be momentarily pulsed and the sleeve 11 will thereafter perserve this saturating magnetic field in the adjacent localized portion of the rod 10.

Should increased hysteresis damping again be desired, however, the winding B is pulsed by source 12 to produce a circumferential magnetic field within the sleeve member 11 which destroys the longitudinal magnetic field produced by winding A. As a result, the associated adjacent portion of the rod 10 returns to a non-saturated condition and the effective air gap is removed. The rod 10 therefore now reverts to a single rod system, having the increased hysteresis damping capability represented, in FIG. 3, by the larger area hysteresis loop 13.

Figure 2:
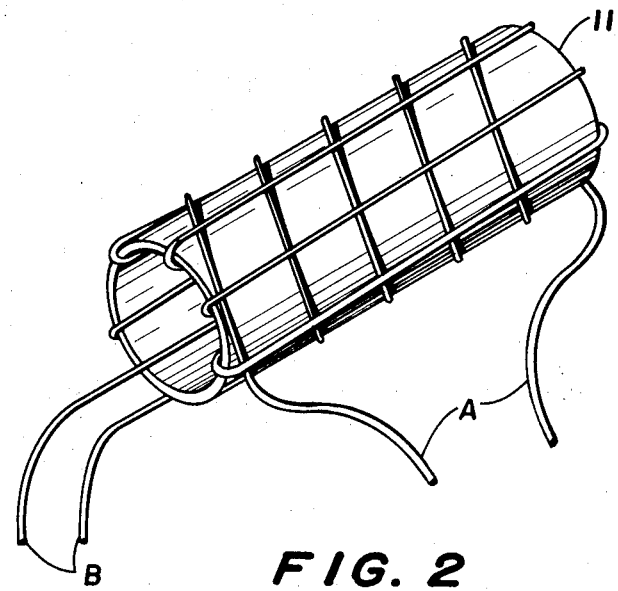
FIG. 2 is an enlarged view of the sleeve member shown in FIG. 1, illustrating the mounting of the winding pair of the sleeve member.
Figure 4:
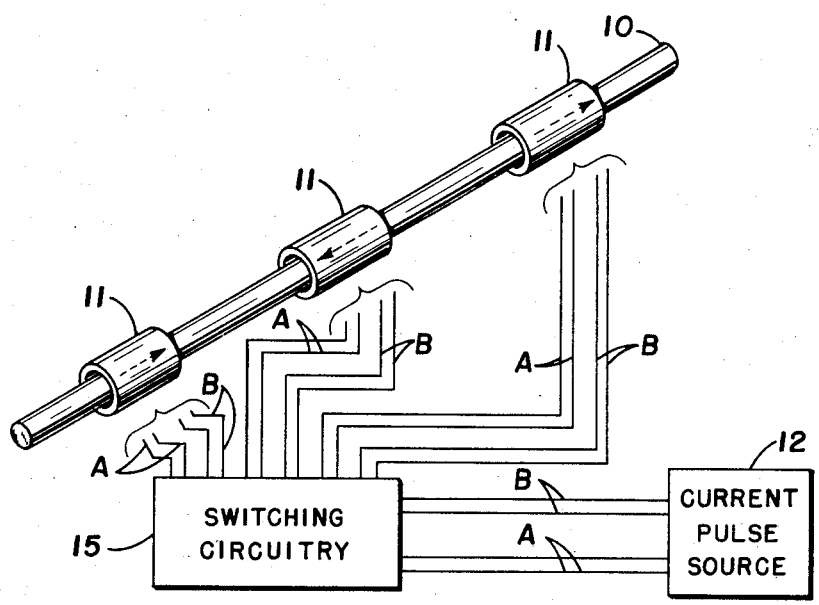
FIG. 4 is a diagrammatic illustration of a modification of the rod system of FIG. 1, showing a plurality of chargeable magnetic sleeves surrounding spaced-apart, localized portions of the magnetic hysteresis rod.

As previously mentioned, the present invention contemplates that more than one chargeable magnetic sleeve 11, each having the associated winding pair illustrated in FIGS. 1 and 2, could be positioned along the length of the rod 10, to effectively divide the rod 10 into any desired number of shorter rods, depending upon the levels of hysteresis damping required in practice. For example, in FIG. 4 of the drawings, three such sleeve members 11 are illustrated as being positioned at spaced-apart points along the rod 10. By selectively energizing the winding pair A–B associated with each of these three sleeve members 11, the rod 10 can be divided in half or in quarters and thereby provide varying levels of hysteresis damping aboard the spacecraft. Preferably, if more than one sleeve member 11 is employed along the length of the hysteresis rod 10, the windings A on adjacent sleeves 11 should be energized in such a manner as to produce oppositedly directed longitudinal magnetic fields within the adjacent, localized portions of the hysteresis rod 10, as represented by the dotted arrows in FIG. 4, in order to minimize the net magnetic dipole moment of the over-all rod system when the sleeves 11 are concurrently energized to effectively divide the damper rod 10 into more than two shorter rods. Otherwise, undesired magnetic torques may be produced upon the spacecraft. These oppositely directed longitudinal magnetic fields might, for example, be produced either by employing an opposite winding sense for the windings A on adjacent sleeve members 11 or by energizing similarly wound windings with opposite polarity current pulses. Circuitry capable of selectively energizing the winding pairs of the plurality of sleeve members 11 can be of any well-known design and is illustrated diagrammatically in FIG. 4. More specifically, the switching circuitry 15 selectively supplies the current pulses from source 12 to the winding pairs A–B, so that the rod system of FIG. 4 acts either as: a single rod (none of the winding pairs energized); two shorter rods (the winding pair for only the middle sleeve connected to receive current pulses); or, four still shorter rods (all three winding pairs connected to receive current pulses), depending upon the desired level of hysteresis damping.

As also previously discussed, the proposed hysteresis damper rod system of the present invention would normally be mounted aboard a satellite, for example, orthogonally with one or more similar rod systems. In FIG. 1 of the drawings, therefore, a second hysteresis damper rod system similar to that described above is shown in dotted form.

Other modifications, adaptations and alterations of the present invention are of course obvious in light of the above teachings. Accordingly, within the scope of the appended claims, the invention may be practiced otherwise than as specifically described.

What is claimed is:

1. A magnetic hysteresis rod system adapted to be mounted on a spacecraft to provide for varying amounts of hysteresis damping comprising,
    an elongated rod member of magnetic hysteresis material capable of providing a predetermined amount of hysteresis damping, and
    at least one magnetic field source comprising an energizable winding means disposed adjacent a preselected localized portion of said magnetic hysteresis rod member for selectively creating at least one localized region of magnetic saturation within said magnetic hysteresis rod member effective to cause said rod member to act as a plurality of shorter magnetic hysteresis rods which collectively provide an amount of hysteresis damping less than said predetermined amount,
    said energizable winding means including a first winding means wound around said localized portion of said magnetic hysteresis rod member and extending along the longitudinal axis of said rod member to produce when energized a longitudinal magnetic field within said rod member of sufficient magnitude to saturate said rod member adjacent said first winding, and a second winding means disposed about said localized portion of said magnetic hysteresis rod member and extending circumferentially about said rod member to produce when energized a circumferential magnetic field about said rod member of sufficient magnitude to render the longitudinal magnetic field produced by said first winding ineffective to saturate said magnetic hysteresis rod.

2. The magnetic hysteresis rod system specified in claim 1 wherein said first and second winding means are each energized by an associated current pulse and further including,
    means disposed adjacent said first and second winding means and said magnetic hysteresis rod member for preserving the magnetic field produced by each of said first and second winding means after termination of the associated energizing current pulse.

3. The magnetic hysteresis rod system specified in claim 2 wherein said magnetic field preserving means is an annular sleeve member formed of chargeable magnetic material surrounding said magnetic hysteresis rod member adjacent said localized region, said first winding means being wound circumferentially about said sleeve member and effective when energized to produce a magnetic field which extends along the length of said sleeve member and longitudinally within the adjacent localized portion of said magnetic hysteresis rod member, and said second winding means being wound about the length of said sleeve member and effective when energized to destroy said longitudinal magnetic field produced by said first winding means and produce a magnetic field which extends circumferentially around said sleeve member effective to return said localized region of said magnetic hysteresis rod member to a non-saturated condition.

4. The magnetic hysteresis rod system specified in claim 3 wherein said sleeve of chargeable magnetic material is formed of vanadium-permendur.

5. The magnetic hysteresis rod system specified in claim 1 wherein a plurality of magnetic field sources, each including one of said localized first energizable winding means, are spaced along the length of said hysteresis rod member and each being operable selectively to produce a localized longitudinal magnetic field within the adjacent portion of said rod member to magnetically saturate that portion of said hysteresis rod member.

6. The magnetic hysteresis rod system specified in claim 5 wherein the longitudinal magnetic fields produced by adjacent ones of said plurality of magnetic field sources are oppositely directed along the length of said hysteresis rod member.

7. The magnetic hysteresis rod system specified in claim 5 wherein each of said magnetic field sources comprises, an annular sleeve member formed of chargeable magnetic material surrounding a portion of said hysteresis rod members, a first winding means wound circumferentially about said sleeve member and effective when energized to produce a magnetic field which extends along the length of said sleeve member and longitudinally within the adjacent localized portion of said hysteresis rod member, a second winding means wound about the length of said sleeve member and effective when energized to destroy the longitudinal magnetic field produced by said first winding means and produce a magnetic field which extends circumferentially around said sleeve member effective to return said localized region of said hysteresis rod member to a non-saturated condition, and current pulse source means for selectively energizing said first and second winding means.

* * * * *